J. F. ZILK.
RUNNER ATTACHMENT FOR VEHICLES.
APPLICATION FILED APR. 16, 1918.
1,289,348.
Patented Dec. 31, 1918.
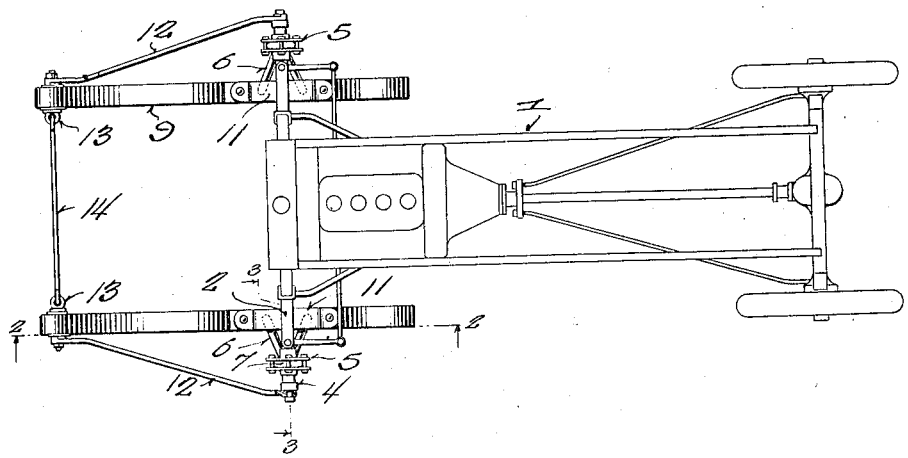
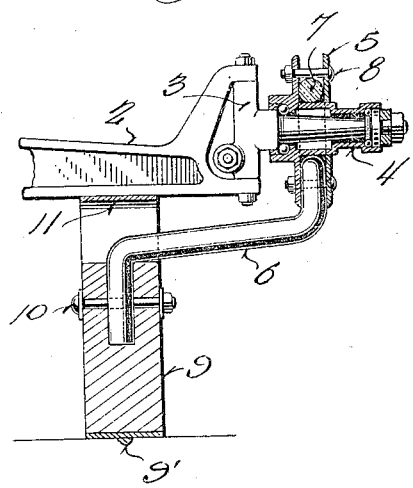

UNITED STATES PATENT OFFICE.

JOSEPH F. ZILK, OF NEILLSVILLE, WISCONSIN.

RUNNER ATTACHMENT FOR VEHICLES.

1,289,348.  Specification of Letters Patent.  Patented Dec. 31, 1918.

Application filed April 16, 1918. Serial No. 228,841.

*To all whom it may concern:*

Be it known that I, JOSEPH F. ZILK, a citizen of the United States, and resident of Neillsville, in the county of Clark and State of Wisconsin, have invented certain new and useful Improvements in Runner Attachments for Vehicles; and I do hereby declare that the following is a full, clear, and exact description thereof.

This invention refers to runner attachments for vehicles and more particularly to that type adapted to displace the wheel of a motor vehicle.

The invention has for its main object to provide a device of the class described which can be attached to the spoke hub of an ordinary wheel.

Another object of the invention is to provide a runner, off-set from alinement with the spoke hub, to enable it to track properly with the standard gage bob-sled track and at the same time to support the front axle of the vehicle thus relieving a portion of the strain which would otherwise come upon the attaching bracket.

The invention in one practical form in which it may be embodied is illustrated in the accompanying drawing, in which:

Figure 1 is a plan view of an automobile chassis with the invention attached thereto.

Fig. 2 is a detail sectional view taken on the line 2—2 of Fig. 1, and

Fig. 3 is a detail sectional view indicated by the line 3—3 of Fig. 1.

Referring now more particularly to the drawing 1 designates an automobile chassis of the standard type having a front axle 2 provided with the usual steering knuckle 3. Mounted on the spindle of the steering knuckle upon the usual anti-friction bearings is a spoke hub 4 provided with a retaining flange 5 which in ordinary use is for the purpose of securing the spokes to the hub.

In the present instance after the spokes have been removed from the spoke hub 4 the brackets 6 having an eyelet 7 formed therein are mounted upon the hub and rigidly held by means of the flange 5 and suitable screws or bolts.

Up to the present time great difficulty has been experienced in the use of runners upon the axles of standard vehicles due to the fact that the standard gage of the ordinary vehicle wheel is of much greater width than that of the bob-sleds commonly in use. To over- come this difficulty the brackets 6 are off-set inwardly and are provided with downwardly turned ends to engage the runners 9 and are secured to the same by means of the bolts 10. In order to overcome the strain upon the brackets 6 resulting from the weight of the car being exerted upon the bracket arched straps 11 adapted to straddle the brackets and support the axle are secured to the top of the runners 9. In order to give the proper traction to the runners to prevent side slippage a bead 9' is secured thereto.

Secured to the end of the steering knuckle spindle and adapted to swing upon an arc similar to the runners are brace rods 12 attached to the runners at their opposite ends by means of eye-bolts 13 carrying a connecting link 14.

From the foregoing description it will be seen that a simple, durable and economical runner attachment has been constructed which can be readily secured to any standard type of motor vehicle without altering its construction or effecting the steering operation thereof. While in the drawing I have shown the rear wheels of the vehicle narrowed up to properly aline with the runner attachment the same forms no part of my invention nor is it necessary to the successful operation of the invention.

What I claim as new is:

1. A runner attachment for a vehicle including an axle and a pivoted steering knuckle, said attachment comprising a runner, a slide bearing on the runner engageable with the under face of the axle to support the axle, a bracket carried by the runner and secured to the steering knuckle to procure steering movement of the runner upon movement of the steering knuckle, said bracket comprising a looped intermediate portion for embracing the steering knuckle, and divergent arm portions extending from said looped portion to the runner.

2. A runner attachment for a vehicle including an axle and a pivoted steering knuckle, said attachment including a runner, a bracket comprising an intermediate looped portion adapted to receive the steering knuckle spindle, and divergent arm portions extending inwardly with respect to the axle and then downwardly for securement in the runner and a bearing plate secured on the runner and disposed above the inner end portions of the bracket arms, said plate being slidably engageable with the under face of the axle to support the axle.

3. A runner attachment for a vehicle including an axle and a pivoted wheel hub, said attachment comprising a runner, a bracket extending from the runner and having a portion adapted to be secured between the flanges of the wheel hub, and a slide bearing on the runner engageable with the axle.

4. A runner attachment for a vehicle including an axle and a pivoted wheel hub, said attachment comprising a runner, a bracket formed of a single bar of metal having its intermediate portion bent to form a loop adapted to embrace the hub and adapted to be secured between the flanges of the hub, the end portions of the bar being offset inwardly with respect to the axle and secured to the runner, and a bearing plate on the runner slidably engageable with the axle to support the axle.

In testimony that I claim the foregoing I have hereunto set my hand at Neillsville, in the county of Clark, and State of Wisconsin.

JOSEPH F. ZILK.

Copies of this patent may be obtained for five cents each, by addressing the "Commissioner of Patents, Washington, D. C."